US009564997B2

(12) United States Patent
Mucke et al.

(10) Patent No.: US 9,564,997 B2
(45) Date of Patent: Feb. 7, 2017

(54) METHOD AND APPARATUS FOR FLUSHING UPLINK HARQ BUFFER IN C-DRX MODE

(71) Applicant: APPLE INC., Cupertino, CA (US)

(72) Inventors: Christian W. Mucke, Sunnyvale, CA (US); Johnson O. Sebeni, Fremont, CA (US); Navid Damji, Cupertino, CA (US); Samy Khay-Ibbat, San Francisco, CA (US); Syed A. Mujtaba, Santa Clara, CA (US); Tarik Tabet, Los Gatos, CA (US); Vinay R. Majjigi, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 38 days.

(21) Appl. No.: 14/453,408

(22) Filed: Aug. 6, 2014

(65) Prior Publication Data

US 2015/0043481 A1    Feb. 12, 2015

Related U.S. Application Data

(60) Provisional application No. 61/863,275, filed on Aug. 7, 2013.

(51) Int. Cl.
*H04W 4/00* (2009.01)
*H04L 1/18* (2006.01)
*H04W 52/02* (2009.01)

(52) U.S. Cl.
CPC .......... *H04L 1/1874* (2013.01); *H04L 1/1854* (2013.01); *H04W 52/0209* (2013.01)

(58) Field of Classification Search
CPC combination set(s) only.
See application file for complete search history.

(56) References Cited

U.S. PATENT DOCUMENTS

| 2010/0091725 A1* | 4/2010 | Ishii | H04W 72/1268 370/329 |
|---|---|---|---|
| 2010/0284360 A1* | 11/2010 | Dalsgaard | H04L 1/0025 370/329 |
| 2011/0029834 A1* | 2/2011 | Yang | H04L 1/1877 714/749 |

(Continued)

*Primary Examiner* — Bob Phunkulh
(74) *Attorney, Agent, or Firm* — Fay Kaplun & Marcin, LLP

(57) ABSTRACT

A method for determining whether an acknowledgement received by a user equipment from an external device is a forced acknowledgement. The method including transmitting a set of data stored in an uplink buffer to an external device, receiving an acknowledgement from the external device, determining if the acknowledgement received from the external device was a forced acknowledgement and flushing out an uplink buffer if determined that the acknowledgement was not a forced acknowledgement. The determining the acknowledgement is a forced acknowledgment being based on whether an uplink retransmission collides with one or more scheduled transmission times, a Physical Hybrid-ARQ Indicator Channel (PHICH) falls between gap measurements and an uplink retransmission collides with one of the gap measurements or a TTI bundling retransmission collides with a gap measurement. If the acknowledgement is not a forced acknowledgment, a set of data stored in the uplink buffer is retransmitted to the external device.

20 Claims, 9 Drawing Sheets

(56) References Cited

U.S. PATENT DOCUMENTS

| | | | |
|---|---|---|---|
| 2011/0286340 A1* | 11/2011 | Janecek | H04L 1/0036 370/252 |
| 2012/0201219 A1* | 8/2012 | Wager | H04L 1/1812 370/329 |
| 2013/0051269 A1* | 2/2013 | Suzuki | H04L 1/1812 370/252 |
| 2013/0070718 A1* | 3/2013 | Lim | H04W 36/0066 370/329 |
| 2013/0083737 A1* | 4/2013 | Earnshaw | H04L 1/1887 370/329 |
| 2013/0114561 A1* | 5/2013 | Simonsson | H04B 7/022 370/329 |
| 2014/0105149 A1* | 4/2014 | Lindoff | H04L 1/0003 370/329 |

* cited by examiner

| PRACH Configuration Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |

Fig. 7

METHOD AND APPARATUS FOR FLUSHING UPLINK HARQ BUFFER IN C-DRX MODE

FIELD OF THE APPLICATION

The disclosure is directed to wireless communications and, more particularly, to power saving in wireless communications.

BACKGROUND OF THE DISCLOSURE

Wireless communication systems are widely deployed to provide various communication services, such as: voice, video, packet data, circuit-switched info, broadcast, messaging services, and so on. A typical wireless communication system, or network, can provide multiple users access to one or more shared resources (e.g., bandwidth, transmit power, etc.). These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and so on.

In LTE, any data transmission requires that the smartphone is in 'high power' Radio Resource Control (RRC) connected state. With all data applications there are often short moments when no data is sent or received and during those moments connected state discontinuous reception (DRX) can save energy. Connected state DRX (C-DRX) cyclically wakes up and shuts down the receiver circuits in order to save energy.

In LTE, C-DRX allows the user equipment (UE) to periodically sleep and not continuously decode the physical downlink control channel (PDCCH) and the physical downlink shared channel (PDSCH). Similarly, for VoLTE type of applications, the enhanced Node B (eNB) can allocate resources in a semi-persistent scheduling fashion (SPS). Those resources are available periodically and no additional signaling is required. This is particularly useful for applications such as voice.

In cellular systems and 3GPP, a Hybrid Automatic Repeat Request (HARQ), which is a combination of forward error coding (FEC) and retransmission mechanism, is used to obtain data communication reliability. As per current 3GPP specifications, in case of uplink (UL) HARQ, the UE needs to stay awake in order to monitor PHICH for all configured retransmissions. The HARQ is then breaking the C-DRX cycle/pattern of ON/OFF period of time, which is impacting the battery life of an UE.

In the current 3GPP standards, in the case where the UE receives an ACK in PHICH, the UE will keep the data in the HARQ buffer. The UE will flush the HARQ buffer only if the maximum number of transmissions has been reached (i.e., an ACK alone is not sufficient to flush the HARQ buffer). Even in the case of C-DRX, the UE has to monitor all the PDCCH opportunities for the number of HARQ transmissions that are configured (e.g., 4 or 5). Even in good conditions, after the UE receives an ACK, the UE is required to stay awake till all possible PDCCH opportunities corresponding to the potential HARQ transmission have been monitored which increases UE wake time and hence reduce the UE's battery life.

Therefore, there is a need for techniques to avoid staying awake when it is not necessary.

BRIEF DESCRIPTION OF THE DRAWINGS

FIG. 7 shows an example of a physical random access channel (PRACH) configuration index;

DETAILED DESCRIPTION

Figure 1:
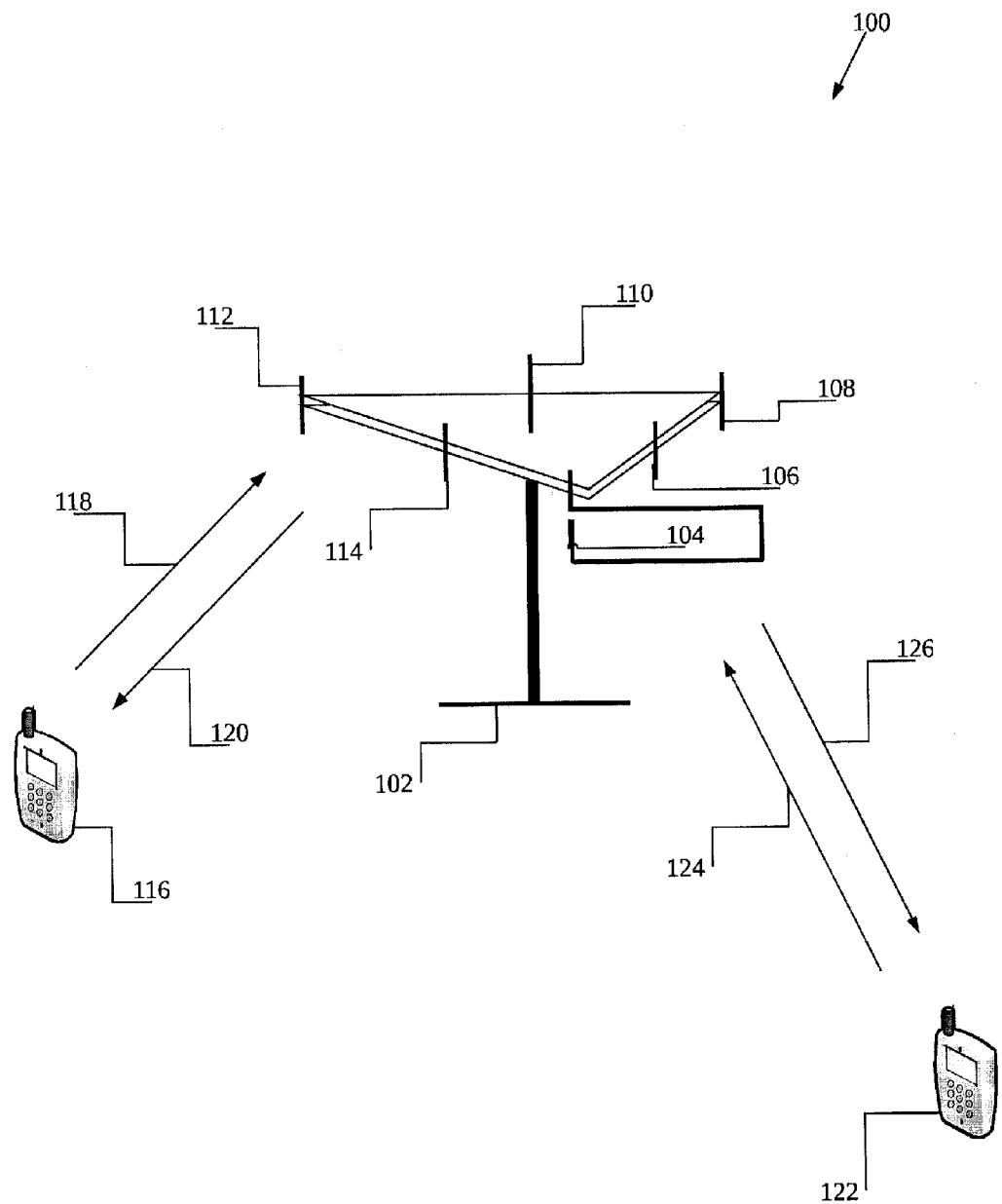
FIG. 1 illustrates an exemplary wireless multiple-access communication system according to certain embodiments.

The following detailed description is directed to certain sample embodiments. However, the disclosure can be embodied in a multitude of different ways as defined and covered by the claims. In this description, reference is made to the drawings wherein like parts are designated with like reference numerals within this application.

This disclosure makes reference to various wireless communication devices, such as access point, mobile device, handset, base station, user equipment, Node B, access terminal, eNB and the like. The use of these and other names that may be associated with specific technologies or standards is not intended to indicate or mandate one particular device, one particular standard or protocol, or one particular signaling direction and is expressly intended to not be limiting of the scope of this application in any way. The use of these and other names is strictly for convenience and such names may be interchanged within this application without any loss of coverage or rights.

Various techniques described herein can be used for various wireless communication systems, technologies and/or networks, such as Code Division Multiple Access ("CDMA") systems, Multiple-Carrier CDMA ("MC-CDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication technique employing the teachings herein may be designed to implement one or more standards, such as IS-95, cdma2000, IS-856, W-CDMA, TDSCDMA, GSM, UMTS, LTE, WiFi, WiMAX and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11 ("WiFi"), IEEE 802.16 "(WiMAX"), IEEE 802.20 ("MBWA"), Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Rel99, Rel5, Rel6, Rel7, and so on) technology, as well as 3GPP2 (IxRTT, 1xEV-DO RelO, RevA, RevB, and so on) technology and other technologies, such as WiFi, WiMAX, WMBA and the like.

Referring to the drawings, FIG. 1 illustrates an exemplary wireless multiple-access communication system 100 according to certain embodiments. As shown in FIG. 1, an enhanced Node B (eNB) base station 102 includes multiple antenna groups. One antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. As shown, user equipment (UE) 116 can be in communication with antennas 112 and 114, where antennas 112 and 114 transmit information to UE 116 over downlink (or forward link) 120 and receive information from UE 116 over uplink (or reverse link) 118. Additionally and/or alternatively, UE 122 can be in communication with antennas 104 and 106, where antennas 104 and 106 transmit information to UE 122 over downlink 126 and receive information from UE 122 over uplink 124. In a frequency division duplex (FDD) system, communication links 118, 120, 124 and 126 can use different frequencies for communication. In time division duplex (TDD) systems, communication links 118, 120, 124 and 126 can use the same frequency or frequencies for communication, but can communicate at differing times.

Each group of antennas and/or the area in which they are designed to communicate can be referred to as a sector of the eNB or base station. In accordance with one aspect, antenna groups can be designed to communicate to mobile devices in a sector of areas (not shown) covered by eNB 102. In communication over downlinks 120 and 126, the transmitting antennas of eNB 102 can utilize beamforming in order to improve the signal-to-noise ratio of downlinks for the different UEs 116 and 122. Also, a base station using beamforming to transmit to UEs scattered randomly through its coverage area can cause less interference to mobile devices in neighboring cells or sectors than a base station transmitting through a single antenna to all of its UEs. In addition to beamforming, antenna groups of a base station, as well as mobile devices, can use other multi-antenna or antenna diversity techniques to send and/or receive information, such as spatial multiplexing, spatial diversity, pattern diversity, polarization diversity, transmit/receive diversity, adaptive arrays, and the like.

Figure 2:
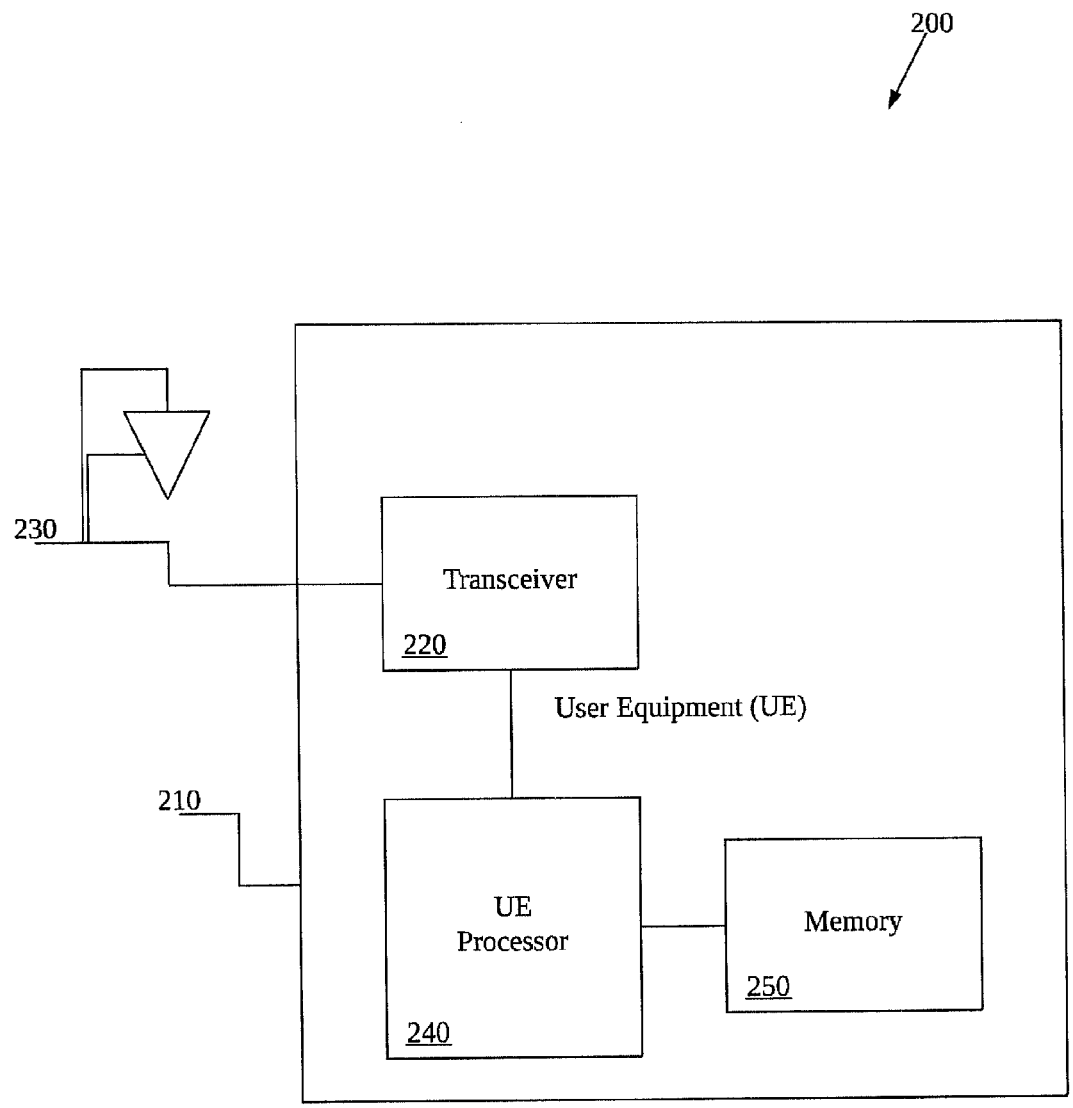
FIG. 2 illustrates a block diagram of an exemplary mobile device or user equipment (UE) according to certain embodiments.

FIG. 2 illustrates a block diagram 200 of an exemplary mobile device, handset (HS) or user equipment (UE) 210 according to certain embodiments. As shown in FIG. 2, UE 210 may include a transceiver 220, an antenna 230, a processor 240, and a memory 250 (which, in certain embodiments, may include memory in a Subscriber Identity Module (SIM) card). In certain embodiments, some or all of the functionalities described herein as being performed by a handset or mobile device may be provided by processor 240 executing instructions stored on a computer-readable medium, such as the memory 250, as shown in FIG. 2. Alternatively, processor 240 and/or memory 250 may be one or more separate processors and/or memories. Additionally, UE 210 may perform uplink and/or downlink communication functions, as further disclosed herein, via transceiver 220 and antenna 230. While only one antenna and one transceiver are shown for UE 210, certain embodiments are equally applicable to multi-antenna and/or multi-transceiver mobile devices. In certain embodiments, UE 210 may include additional components beyond those shown in FIG. 2 that may be responsible for enabling or performing the functions of UE 210, such as communicating with a base station in a network and for processing information for transmitting or from reception, including any of the functionality described herein. Such additional components are not shown in FIG. 2 but are intended to be within the scope of coverage of this application.

Figure 3:
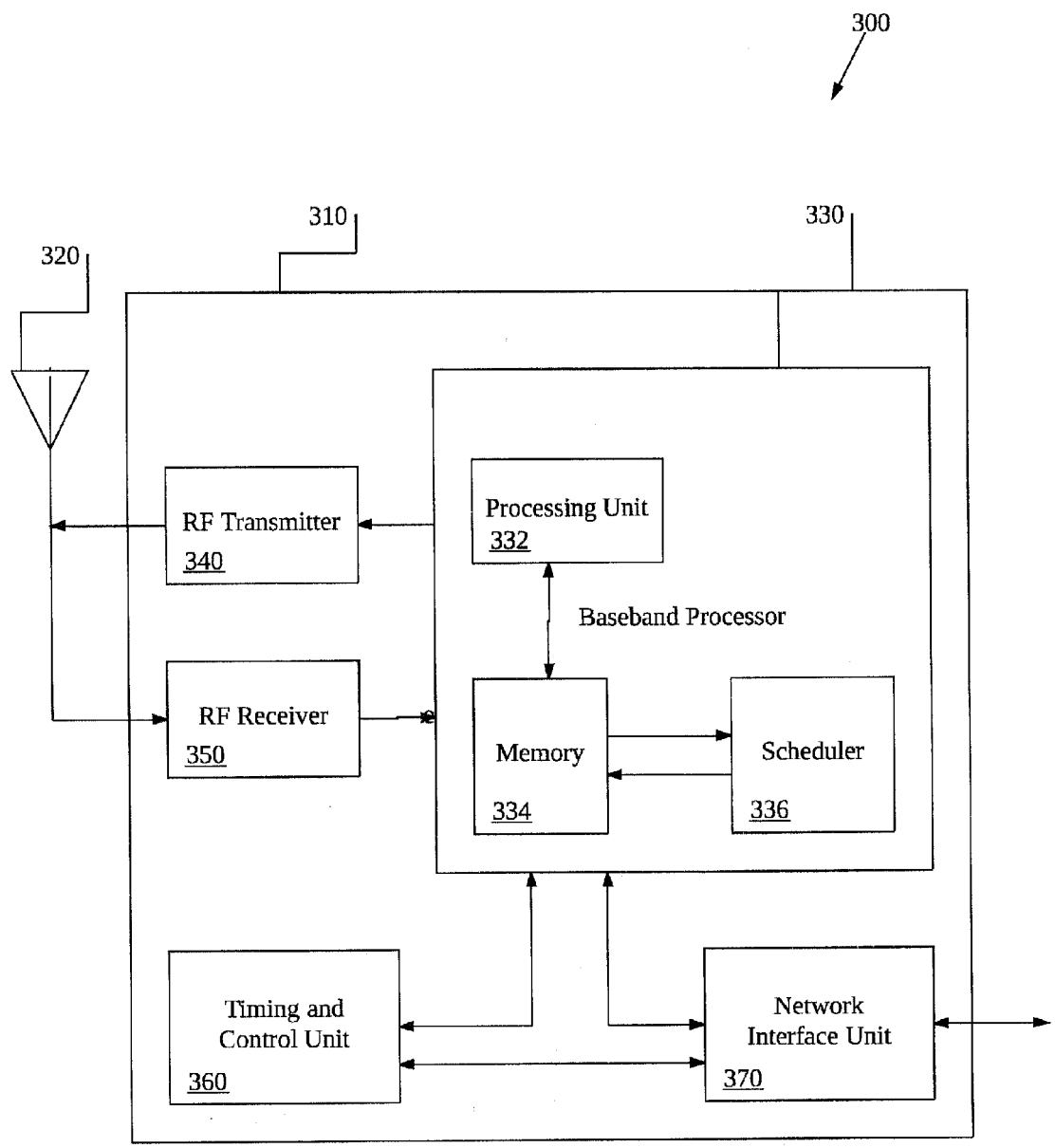
FIG. 3 illustrates a block diagram of an exemplary enhanced Node B (eNB) or similar mobile communication node (e.g., base station, access point, etc.) according to certain embodiments.

FIG. 3 illustrates a block diagram 300 of an exemplary enhanced Node B (eNB) 310 or similar mobile communication node (e.g., base station, access point, etc.) according to certain embodiments. As shown in FIG. 3, eNB 310 may include a baseband processor 330 to provide radio communication with mobile handsets via a radio frequency (RF) transmitter 340 and RF receiver 350 units coupled to eNB antenna 320. While only one antenna and one transceiver set are shown, certain embodiments are applicable to multi-antenna and/or multi-transceiver set configurations. RF transmitter 340 and RF receiver 350 may be combined into one, transceiver unit, and/or duplicated to facilitate multiple antenna communication. Baseband processor 330 may be configured (in hardware and/or software) to function according to a wireless communications standard, such as 3GPP LTE. Alternatively, multiple baseband processors may be included in eNB 310. Baseband processor 330 may include a processing unit 332 in communication with a memory 334 to process and store relevant information for the eNB and a scheduler 336, which may provide scheduling decisions for mobile devices serviced by eNB 310. Scheduler 336 may have some or all of the same data structure as a typical scheduler for an eNB in an LTE system. Alternatively, processing unit 332 and/or memory 334 may be one or more separate processors and/or memories. In certain embodiments, some or all of the functionalities described herein as being performed by an enhanced Node B, access point or base station may be provided by processing unit 332 executing instructions stored on a computer-readable medium, such as memory 334, as shown in FIG. 3.

Baseband processor 330 may also provide additional baseband signal processing (e.g., mobile device registration, channel signal information calculation and/or transmission, radio resource management, etc.) as required. Processing unit 332 may include, by way of example, one or more of the following: a general purpose processor, a special purpose processor, a conventional processor, a digital signal processor (DSP), a microprocessor, a microprocessor in association with a DSP core, a controller, a microcontroller, an Application Specific Integrated Circuits (ASICs), Field Programmable Gate Arrays (FPGAs) circuits, and any other type of integrated circuit (IC) and/or state machine. Some or all of the functionalities described herein as being provided by a mobile base station, a base station controller, a node B, an enhanced node B, an access point, a home base station, a femtocell base station, and/or any other type of mobile communications node may be provided by processing unit 332 executing instructions stored on a computer-readable data storage medium, such as the memory 334 shown in FIG. 3.

In certain embodiments, eNB 310 may further include a timing and control unit 360 and a core network interface unit 370, such as are shown in FIG. 3, each in communication with the other and with baseband processor 330. Timing and control unit 360 may monitor operations of baseband processor 330 and network interface unit 370, and may provide appropriate timing and control signals to these units. Network interface unit 370 may provide a bi-directional interface for eNB 310 to communicate with a core or back-end network (not shown) to facilitate administrative, data-management and/or call-management functions for mobile subscribers operating in the network through eNB 310.

In certain embodiments, base station 310 may include additional components responsible for providing additional functionality, including any of the functionality identified herein and/or any functionality necessary to support the techniques described herein. Although features and elements are described in particular combinations, each feature or element can be used alone without the other features and elements or in various combinations with or without one or more features and elements. Techniques provided herein may be implemented in a computer program, software, or firmware incorporated in a computer-readable storage medium (e.g., memory 334 in FIG. 3) for execution by a general purpose computer or a processor (e.g., processing unit 332 in FIG. 3). Examples of computer-readable storage media include read only memory (ROM), random access memory (RAM), digital registers, cache memory, semiconductor memory devices, magnetic media such as internal hard disks, magnetic tapes and removable disks, magneto-optical media, and optical media such as CDROM disks, digital versatile disks (DVDs), and so on. Such computer-readable storage media may be separate units, may be incorporated as part of one or more other units (e.g., processing unit 332 in FIG. 3), or may be a combination of separate and incorporated units.

Figure 4:
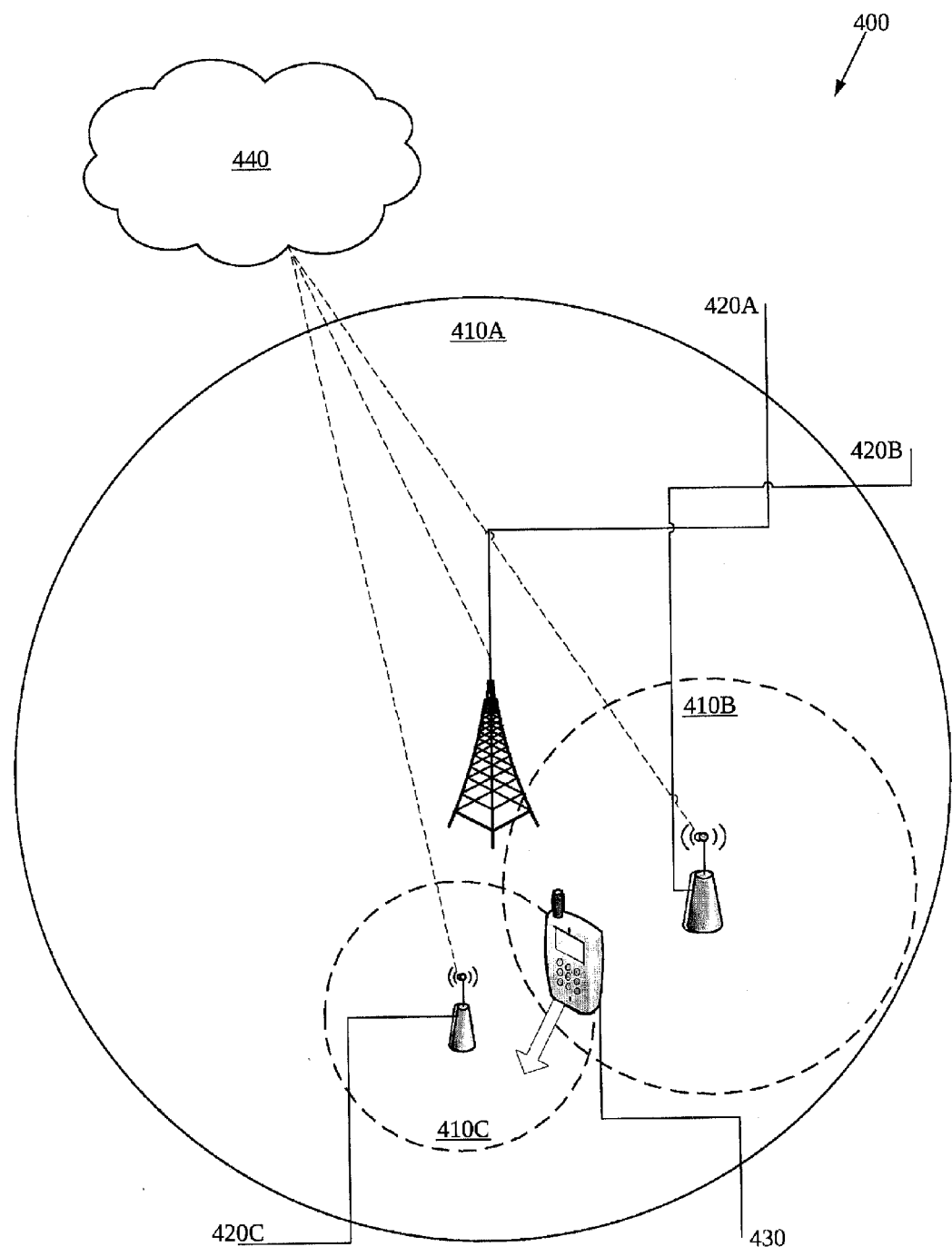
FIG. 4 illustrates an exemplary multi-RAT wireless network according to certain embodiments.

FIG. 4 illustrates an exemplary multi-RAT (radio access technology) wireless network 400 according to certain embodiments. As shown in FIG. 4, a mobile device (handset, UE, etc.) 430 is within the coverage area of multi-RAT wireless network 400. Multi-RAT wireless network 400 can include multiple-technology network coverage pieces. For example, one technology coverage area can be a cell 410A, such as in an LTE coverage area. Within (or partially within) cell 410A coverage area, there can concurrently exist one or more other technology coverage areas, for example cells 410B and 410C, each of which may be a GSM, UMTS, WiMAX, CDMA or even WiFi coverage area. As shown, cells 410B, 410C are within cell 410A and at least partially overlap each other, although this configuration is for illustrative purposes only. Each cell 410 can also include some sort of network access device 420A, 420B and 420C, such as a base station, eNodeB or access point. Each network access device 420 can communicate with one or more mobile devices 430, as well as with a core network 440 (and even, perhaps, with each other). Not shown are possible intermediate network components or system elements that may be between each network access device 420 and core network 440. In certain embodiments, mobile device 430 can be moving within cell 410A and moving out of cell 410B and into cell 410C. In this way, mobile device 430 could possibly communicate with one or more of cells 410A, 410B and 410C.

Figure 5:
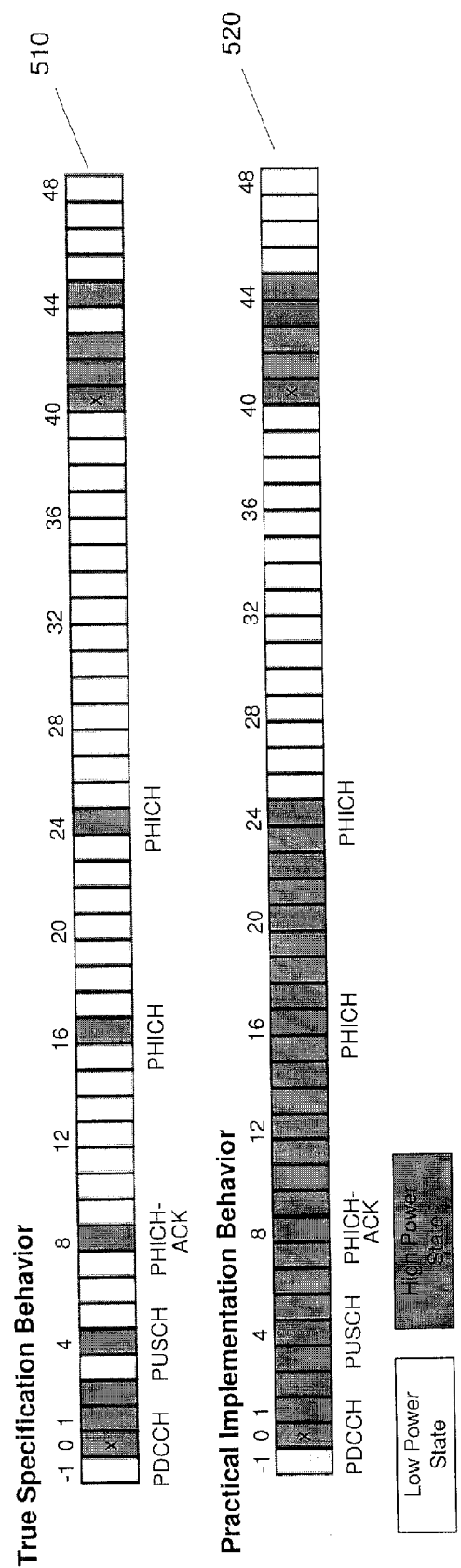
FIG. 5 shows an exemplary operation of a UE in SPS.

The exemplary embodiments provide a manner of alleviating the impact of HARQ on power savings by reducing the wake-up timeline in a C-DRX/SPS configuration. The following provides an example of the operation of a UE in a UL Transmission in a SPS scenario. FIG. 5 shows an exemplary operation of a UE in SPS. As shown by the True Specification Behavior 510, even if the first UL transmission is successful, the UE still has to monitor all the PDCCH. In the ideally behaving UE (e.g., True Specification Behavior 510), this can be seen as additional "ON" time for subframes 8, 16, and 24. However, in practice it takes time for a UE to turn on and off hardware and software (HW/SW) processing circuitry. So the actual behavior of the UE may look closer to the Practical Implementation Behavior 520, where the UE is burning power in the high power state as illustrated. In the power saving behavior (e.g., True Specification Behavior 510), if the first transmission is successful, the UE can switch off all HW/SW processing after subframe 8 (first ACK) and save power battery. However this is not allowed per the 3GPP specifications (cf. 36.321).

Figure 6:
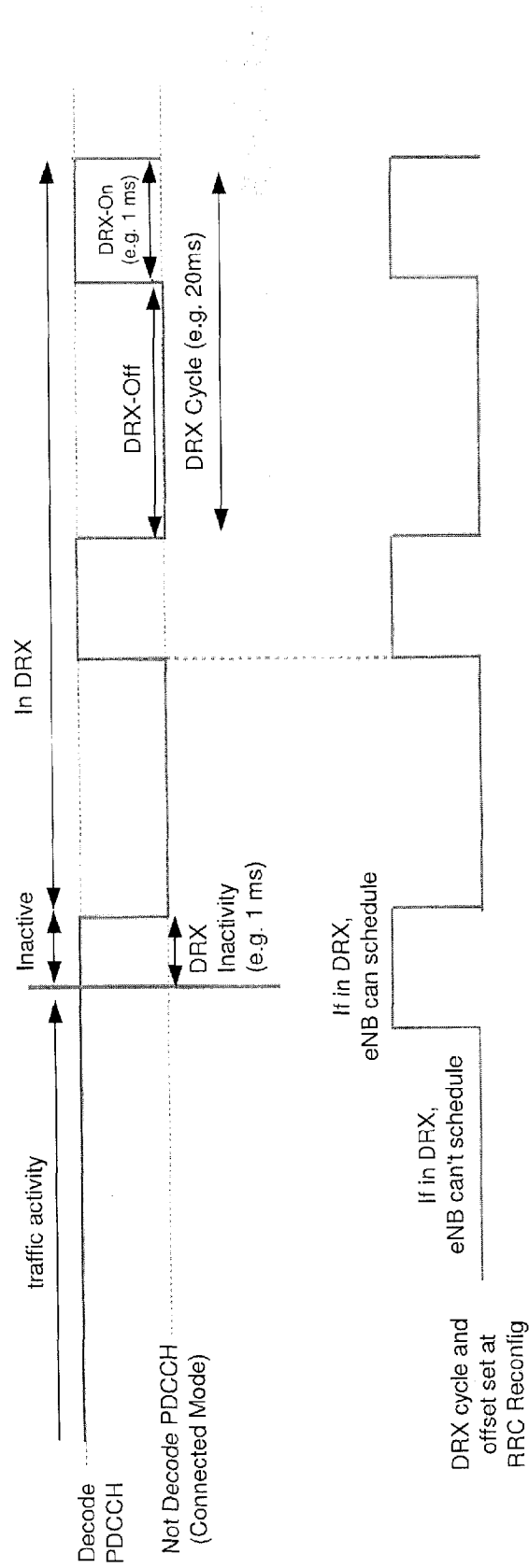
FIG. 6 shows an exemplary DRX cycle.

As described above, C-DRX allows the UE to periodically sleep and not continuously decode PDCCH. The tradeoff is between latency and UE power savings. FIG. 6 shows an exemplary DRX cycle. Timer-based parameters are sent on RRC Reconfiguration Message. The DRX Cycle is the duration of one cycle of UE On/Off Time (e.g., 320 ms for Long DRX). The on Duration Timer is the duration of time UE monitors PDCCH during DRX Cycle (e.g., 10 ms). The DRX Inactivity Timer starts running after receiving a grant within the PDCCH, while the timer is running, the UE continuously monitors PDCCH. Once the timer expires, the UE can stop monitoring PDCCH, and can go back to sleep. (e.g., 200 ms). If the UE receives a MAC CE (Control Element) DRX command, then the UE stops the On Duration Timer and the DRX Inactivity Timer, goes to sleep and continues the C-DRX cycle.

In current eNB implementations, a forced ACK is an ACK sent from an eNB to a UE following an UL PUSCH transmission but its meaning isn't necessarily acknowledging the UE's transmission. Rather, it provides the eNB a tool to delay the UE's retransmission. For example, the forced ACK can be used to avoid a UL retransmission that would otherwise collide with a PRACH transmission or a gap measurement. Even if an UL transmission has failed, the eNB will send this forced ACK to avoid a UL retransmission of that same packet. In this case, the UE does not flush the HARQ buffer, then the eNB will send a retransmission grant on PDCCH, and the UE will retransmit the corresponding packet. As per current eNB implementations, the only cases where an ACK does not automatically translate to a successful decoding by the eNB of the UL transmission are: (1) UL retransmission colliding with a PRACH; (2) Physical Hybrid-ARQ Indicator Channel (PHICH) falling in between gap measurements and UL retransmission colliding with a gap measurement; and (3) TTI bundling retransmission collides with a gap measurement.

In the exemplary embodiments, the UE determines if the ACK received was due to a successful transmission or a forced ACK (unsuccessful transmission and the eNB is trying to avoid the collision during next retransmission opportunity between an UL retransmission and a PRACH/Gap Measurement). In general, HARQ is used to ensure that data was successfully decoded by the receiver. For the UL, UE will have several opportunities to transmit data, for example 4 times. Generally, UE could transmit in subframes sf4, sf12, sf20, sf28. The UE remains awake throughout this duration in the event the UE needs to retransmit the data. However, if the data was received and successfully decoded, there is no need to stay awake through the entire HARQ period (i.e., through all the transmission opportunities).

When the UE transmits data, the eNB will send an ACK, NACK or PDCCH to notify the UE whether or not it received the data and was able to decode it. If a NACK or PDCCH with a retransmission grant was received, that is an indication by the eNB to the UE to retransmit the data on the next transmission opportunity. Even though an ACK is sent after the 4 slots after the UE transmitted, the ACK could be a forced ACK or truly an ACK that is notifying the UE of successful transmission. In the existing system, the UE is not able determine if the ACK received was a forced ACK or an ACK indicating successful reception.

Figure 8:
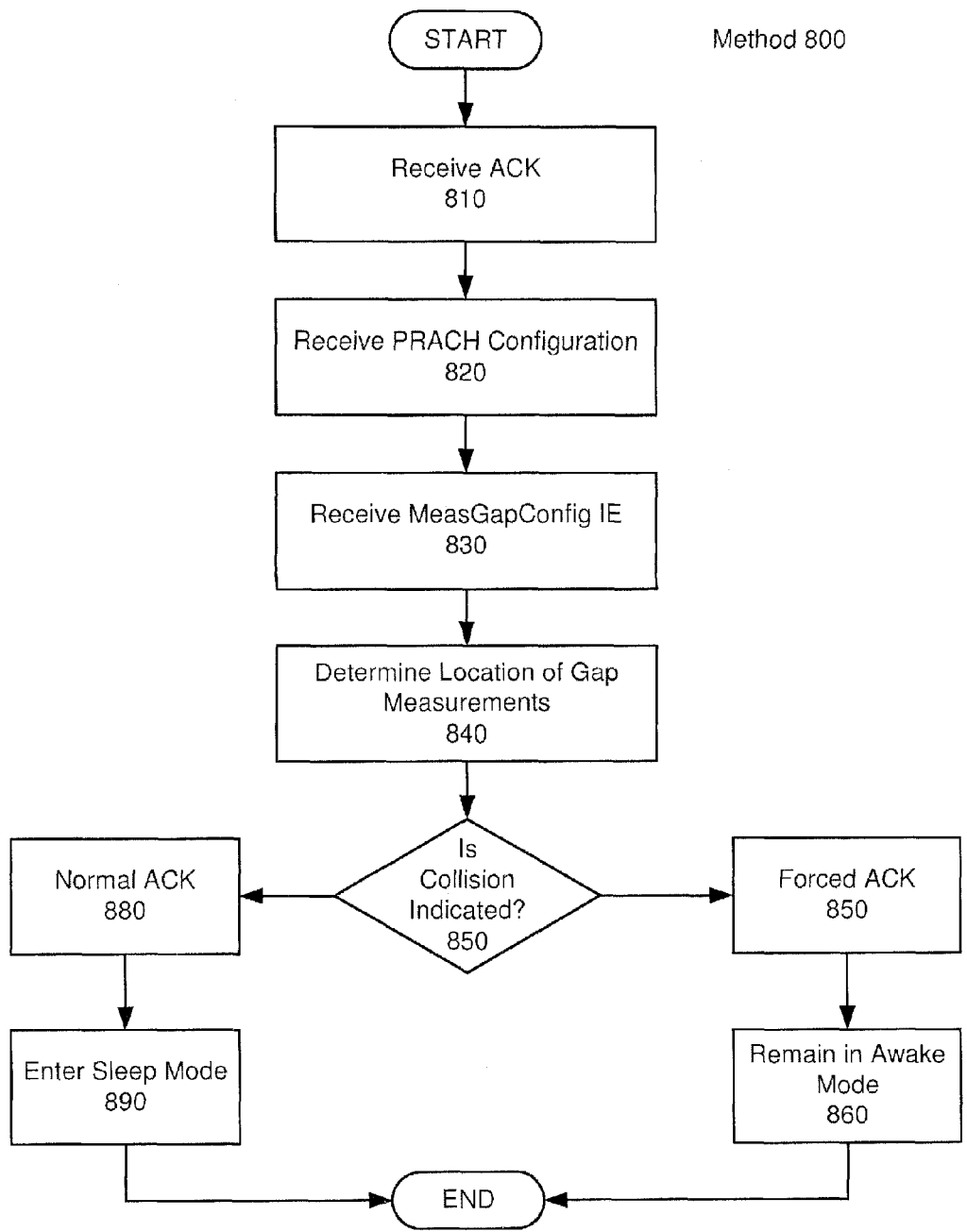
FIG. 8 shows an exemplary method for determining whether an ACK received by a UE is a forced ACK.

FIG. 8 shows an exemplary method 800 for determining whether an ACK received by a UE is a forced ACK. In step 810, the UE receives an ACK from the eNB. The remaining steps of the method 800 are used to determine if the received ACK is a forced ACK or a normal ACK that indicates the eNB correctly received the UL transmission and the operation of the UE based on this determination. It should be noted that the receipt of the ACK does not need to be the first step of the method, e.g., the UE may receive the ACK at any time. It should also be noted that the method 800 is being described with reference to analyzing one received ACK. The UE may perform the method 800 for each received ACK or a subset of received ACKS.

In step 820, the UE receives the PRACH configuration information comprising the PRACH configuration index. FIG. 7 shows an example of a PRACH configuration index. This information is common to all UEs in a cell. The PRACH configuration index notifies the UE where it can send a PRACH. Similarly, in step 830, the UE may receive a MeasGapConfig Information Element (IE) during the receipt of an RRC Connection Reconfiguration message. The MeasGapConfig IE includes all the information about the measurement gap (e.g., the repetition period, the length, the gap start, etc.)

Based on this received information, in step 840, the UE may determine exactly the location in time of the gap measurement. In step 850, the UE may compare this location of the gap measurement to determine if the gap measurement collides with a UL retransmission. Thus, if the next scheduled retransmission time will collide with the measurement gap or RACH (scheduled collision time), then UE will determine, in step 860, that the received. ACK is a forced ACK. Since the ACK has been determined to be a forced ACK, the UE will remain in the awake mode in step 870. As part of remaining in the awake mode, the UE will not flush the data from the HARQ buffer. In this manner, the data that remains in the HARQ buffer may be used to retransmit at next opportunity if the UE receives a further indication from the eNB that the UL transmission was not received correctly (e.g. a PDCCH indicating a retransmission).

Otherwise, if in step 850, it is determined that the next scheduled retransmission will not collide with the measurement gap, the UE will determine, in step 880, that the ACK is a normal ACK. The term "normal ACK" means an ACK that indicates a successful transmission, rather than the above described forced ACK. The UE may then, in step 890, proceed with entering the sleep mode. As part of entering the sleep mode, the UE may flush the HARQ buffer. The buffer may be flushed because this data has been successfully transmitted, as indicated by the receipt of the normal ACK, and is therefore no longer needed.

In a further exemplary embodiment, the UE may perform the steps of method 800, but may also perform one or more additional steps to ensure that the determination of a forced ACK (step 850) or a normal ACK (Step 880) is correct. For example, in one exemplary embodiment, the UE may measure transmission characteristics between the UE and eNB to aid in determining whether the ACK was a normal ACK or forced ACK. For example, the transmission characteristics may include a signal-to-noise ratio (SNR), a signal-to-interference-plus-noise ratio (SINR), a received signal strength indicator (RSSI), etc. These transmission characteristics may be used as a check by the UE to verify that the ACK was a normal ACK. For example, if the transmission characteristic is favorable (e.g., there is a good connection between the UE and the eNB), it is more likely that the ACK was correctly identified as a normal ACK because the transmission characteristics do not indicate there is a problem in the connection between the UE and the eNB. This extra step, may be performed, for example, after step 880, where it is determined the ACK is a normal ACK. However, this additional check step may be performed at any time during the process.

In a further exemplary embodiment, the UE may perform the steps of method 800, but also wait for one more cycle before flushing the HARQ buffer and going to sleep in step 890. For example, after the determination in step 880 that the ACK was a normal ACK, the UE may not proceed directly to step 890, but remain awake for another cycle to determine if the eNB sends an indication that the UL transmission was not received correctly. For example, if the data was not received correctly, the eNB will send a PDCCH to request retransmission after a forced ACK. Thus, while the UE determined that the ACK was a normal ACK, this check on the determination (if the PDCCH requesting retransmission was received) would indicate that the determination was incorrect and the UE would not proceed to step 890 to flush the buffer and enter sleep mode. If the UE were to implement this check, the UE would save less power but has more guarantee that data was successfully transmitted and the normal ACK determination is correct. It should be noted that this additional step may be performed on its own or in conjunction with the other exemplary checks described herein.

Figure 9:
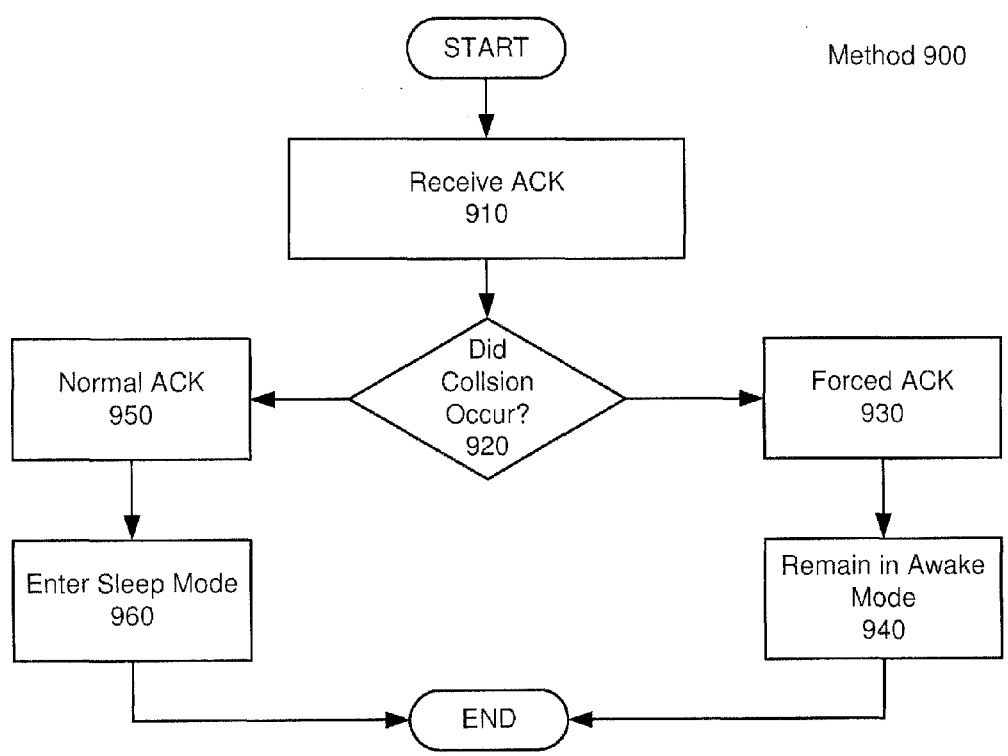
FIG. 9 shows a further exemplary method for determining whether an ACK received by a UE is a forced ACK.

FIG. 9 shows a further exemplary method 900 for determining whether an ACK received by a UE is a forced ACK. In step 910, the UE receives the ACK. In step 920, UE determines if there were any collisions. The UE may consider various factors in determining whether there was a collision (e.g., RACH, TTI-bundling, Gap, etc.). If in step 920, the UE detects that there is a collision, then that is an indication that the ACK was a forced ACK to stop UE from transmitting at the next transmit opportunity. Thus, in step 930, the UE determines the ACK is a forced ACK. In this case, the method proceeds to step 940, where the UE stays awake until it receives a PDCCH or the maximum number of retransmissions opportunities is reached. If another ACK is received, the same analysis is conducted for this cycle and so on.

Returning to step 920, if no collision was detected, the UE determines, in step 950 that the ACK was a normal ACK. The UE may then enter the sleep mode in step 960, which, similar to step 890 described above, includes flushing the HARQ buffer. It should be noted that the UE may go directly from step 950 to step 960 or may also conduct one or more further checks, some examples of which were described above, to verify the determination of a normal ACK. These checks may provide further assurance that data was received and decoded correctly and the ACK received was decoded correctly (not a false alarm).

Certain details common to those skilled practitioners in the wireless communication art may have been omitted in this application for brevity. Those details can be found in any number of textbooks, journal articles, Internet publications, and the like. For example, such details can be found in: Christopher Cox, "An Introduction to LTE-LTE, LTE-Advanced, SAE and 4G Mobile Communications" (2012); or Erik Dahlman, et al., "4G LTE/LTE-Advanced for Mobile Broadband" (2011), both of which are fully incorporated herein by reference for all purposes.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints or preferences imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in one or more software modules executed by one or more processing elements, or in a combination of the two. A software module may reside in RAM memory, flash memory, ROM memory, EPROM memory, EEPROM memory, registers, hard disk, a removable disk, a CD-ROM, or any other form or combination of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added.

What is claimed is:

1. A method for wireless communication comprising:
   at a user equipment:
   transmitting a set of data stored in an uplink buffer to an external device;
   receiving an acknowledgement from the external device, wherein the acknowledgement indicates that the set of data has been correctly received by the external device;
   determining if the acknowledgement received from the external device was a forced acknowledgement, wherein the determining if the acknowledgement was a forced acknowledgement includes one of;
   (i) determining if an uplink retransmission collides with one or more scheduled transmission times based on a physical random access channel ("PRACH") configuration; or
   (ii) determining if the uplink retransmission collides with a gap measurement; and
   flushing out an uplink buffer if determined that the acknowledgement was not a forced acknowledgement.

2. The method according to claim 1, wherein the determining if the acknowledgement was a forced acknowledgement includes determining if a Physical Hybrid-ARQ Indicator Channel (PHICH) falls between gap measurements.

3. The method according to claim 1, wherein the determining if the acknowledgement was a forced acknowledgement includes determining if a TTI bundling retransmission collides with a gap measurement.

4. The method of claim 1, further comprising:
   retransmitting, during a retransmission time, the set of data stored in the uplink buffer to the external device if determined that the acknowledgement was a forced acknowledgement.

5. The method of claim 1, further comprising: receiving configuration information that includes the one or more scheduled transmission times.

6. The method of claim 1, further comprising:
   entering a sleep mode if determined that the acknowledgement was not a forced acknowledgement.

7. The method of claim 6, further comprising:
   prior to entering the sleep mode, waiting for a predetermined amount of time after it is determined that the acknowledgement was not a forced acknowledgement; and
   determining if a transmission is received from the external device during the predetermined period of time, wherein the receipt of the transmission indicates the determining the acknowledgement was not a forced acknowledgement is incorrect.

8. The method of claim 1, further comprising:
   measuring a transmission characteristic between the user equipment and the external device, wherein the determining is further based on the transmission characteristic, wherein the transmission characteristic is one of a signal-to-noise ratio (SNR), a signal-to-interference-plus-noise ratio (SINR), and a received signal strength indicator (RSSI).

9. The method of claim 1, wherein the external device is one of an evolved Node B base station and a Node B base station.

10. A user equipment, comprising:
a wireless transceiver configured to transmit a set of data stored in an uplink buffer to an external device and receive an acknowledgement from the external device;
a processor; and
a non-transitory computer-readable medium comprising one or more computer program instructions which are configured to, when executed by the processor, cause the user equipment to:
determining if the acknowledgement received from the external device was a forced acknowledgement, wherein the acknowledgement indicates that the set of data has been correctly received by the external device; and
flushing out an uplink buffer if determined that the acknowledgement was not a forced acknowledgement.

11. The user equipment of claim 10, wherein the computer program instructions cause the processor to determine if the acknowledgement was a forced acknowledgement by determining if the acknowledgement was a forced acknowledgement includes determining if a Physical Hybrid-ARQ Indicator Channel (PHICH) falls between gap measurements and an uplink retransmission collides with one of the gap measurements.

12. The user equipment of claim 10, wherein the computer program instructions cause the processor to determine if the acknowledgement was a forced acknowledgement by determining if a TTI bundling retransmission collides with a gap measurement.

13. The user equipment of claim 10, wherein the transceiver retransmits, during a retransmission time, the set of data stored in the uplink buffer to the external device if determined that the acknowledgement was a forced acknowledgement.

14. The user equipment of claim 10, wherein the computer program instructions further cause the processor to:
enter a sleep mode if determined that the acknowledgement was not a forced acknowledgement.

15. The user equipment of claim 14, wherein the computer program instructions further cause the processor to:
prior to entering the sleep mode, waiting for a predetermined amount of time after it is determined that the acknowledgement was not a forced acknowledgement; and
determining if a transmission is received from the external device during the predetermined period of time, wherein the receipt of the transmission indicates the determining the acknowledgement was not a forced acknowledgement is incorrect.

16. The method of claim 10, wherein the determining if the acknowledgement was a forced acknowledgement includes one of:
(i) determining if an uplink retransmission collides with one or more scheduled transmission times based on a physical random access channel ("PRACH") configuration; or
(ii) determining if the uplink retransmission collides with a gap measurement.

17. A non-transitory computer readable storage medium that stores an executable program, which, when executed, causes a processor to:
transmit a set of data stored in an uplink buffer to an external device;
receive an acknowledgement from the external device, wherein the acknowledgement indicates that the set of data has been correctly received by the external device;
determine if the acknowledgement received from the external device was a forced acknowledgement, wherein the determining if the acknowledgement was a forced acknowledgement includes determining if an uplink retransmission collides with one or more scheduled transmission times based on a physical random access channel ("PRACH") configuration; and
flush out an uplink buffer if determined that the acknowledgement was not a forced acknowledgement.

18. The non-transitory computer readable storage medium of claim 17, wherein the executable program further causes the processor to:
retransmit, during a retransmission time, the set of data stored in the uplink buffer to the external device if determined that the acknowledgement was a forced acknowledgement.

19. The non-transitory computer readable storage medium of claim 17, wherein the determining if the acknowledgement was a forced acknowledgement further includes determining if the uplink retransmission collides with a gap measurement.

20. The non-transitory computer readable storage medium of claim 17, wherein the executable program causes the processor to determine the acknowledgement is a forced acknowledgment by determining one of:
(i) if a Physical Hybrid-ARQ Indicator Channel (PHICH) falls between gap measurements and an uplink retransmission collides with one of the gap measurements; or
(ii) if a TTI bundling retransmission collides with a gap measurement.

* * * * *